H. E. KERR.
BAKING OVEN.
APPLICATION FILED DEC. 22, 1919.
1,391,835.
Patented Sept. 27, 1921.
3 SHEETS—SHEET 1.
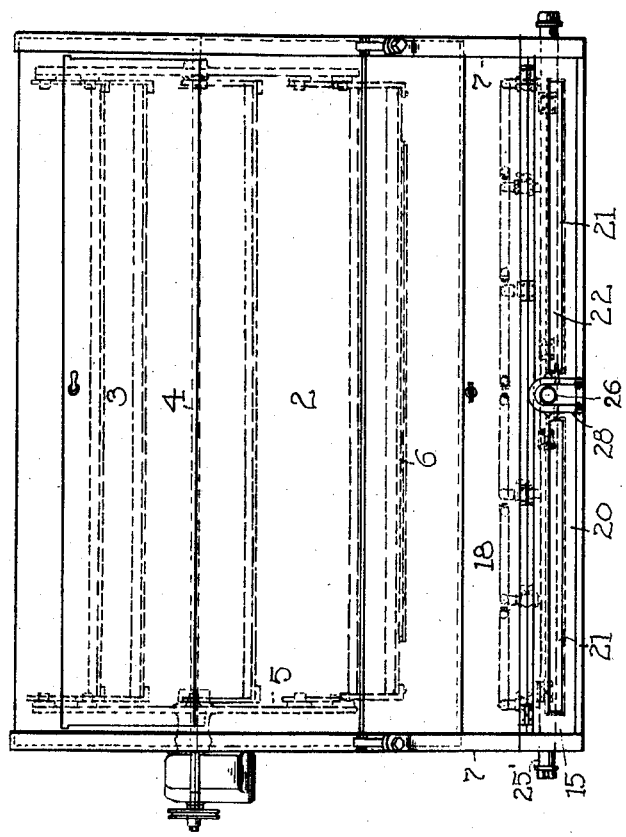
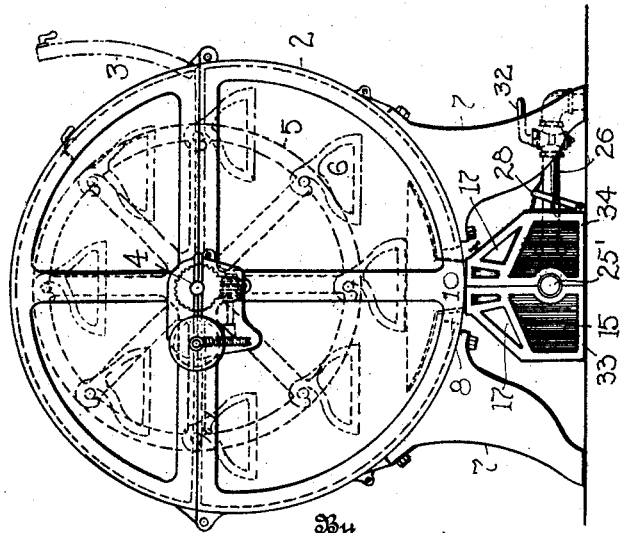
Inventor
H. E. Kerr

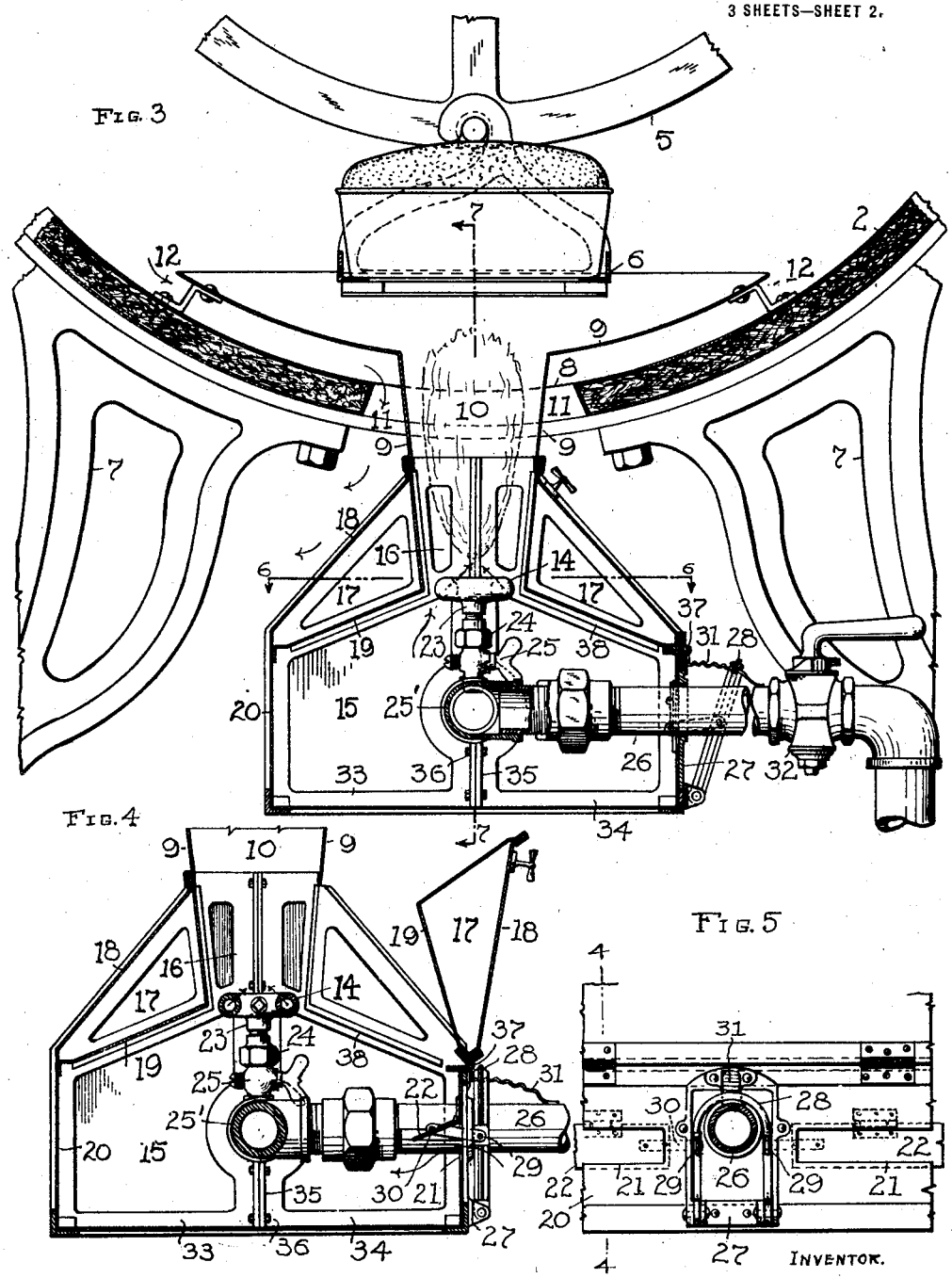

H. E. KERR.
BAKING OVEN.
APPLICATION FILED DEC. 22, 1919.

1,391,835.

Patented Sept. 27, 1921.
3 SHEETS—SHEET 3.

Inventor
H. E. Kerr

By Fisher & Moser
Attorneys

UNITED STATES PATENT OFFICE.

HARRY E. KERR, OF CLEVELAND, OHIO, ASSIGNOR TO THE FEDERAL SYSTEM OF BAKERIES OF AMERICA, OF DAVENPORT, IOWA, A CORPORATION OF DELAWARE.

BAKING-OVEN.

1,391,835.  Specification of Letters Patent.  Patented Sept. 27, 1921.

Application filed December 22, 1919. Serial No. 346,647.

*To all whom it may concern:*

Be it known that I, HARRY E. KERR, a citizen of the United States, residing at Cleveland, in the county of Cuyahoga and State of Ohio, have invented certain new and useful Improvements in Baking-Ovens, of which the following is a specification.

My invention relates to an improvement in baking ovens, and the improvement comprises a heating appliance which is particularly constructed and arranged to promote efficient baking operations in an oven into which the heat products are directly discharged or wherein the articles to be baked are adapted to travel in an orbit.

In one type of oven into which the heat products of a gaseous fuel burner are directly discharged it has been heretofore difficult to maintain perfect combustion at the burner and a uniform temperature and distribution of the heat products throughout the oven. Further, when the door of the oven is opened and closed as occurs frequently in operations the circulation of the heat products and the operation of the burner is materially affected and the flame is often extinguished.

My object is to provide an appliance which will not only overcome the objections noted, but will also promote a uniform distribution of the heat products within the oven without waste and with the use of a minimum amount of fuel and without smothering the flame or influencing the conditions which establish and fix a state of perfect combustion at the burner.

Figure 6:
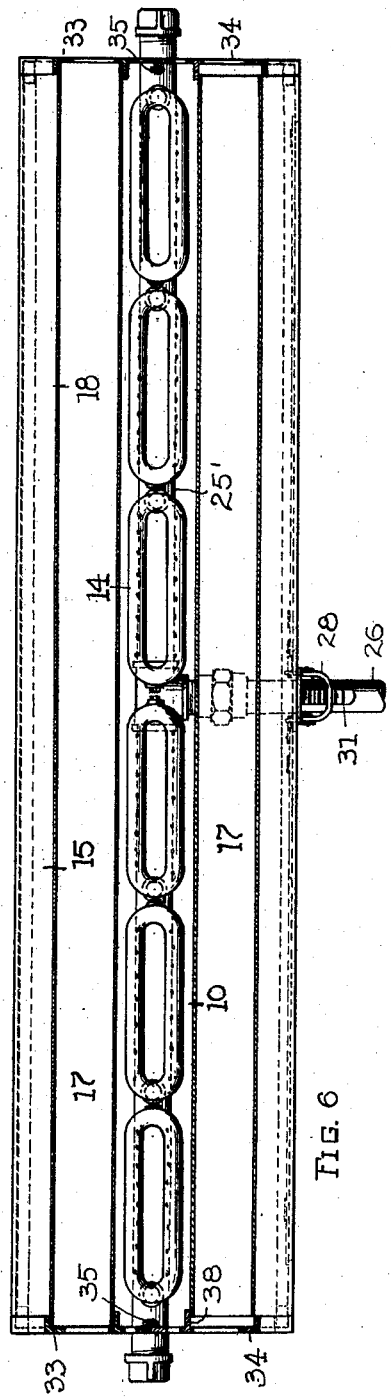
Figure 7:
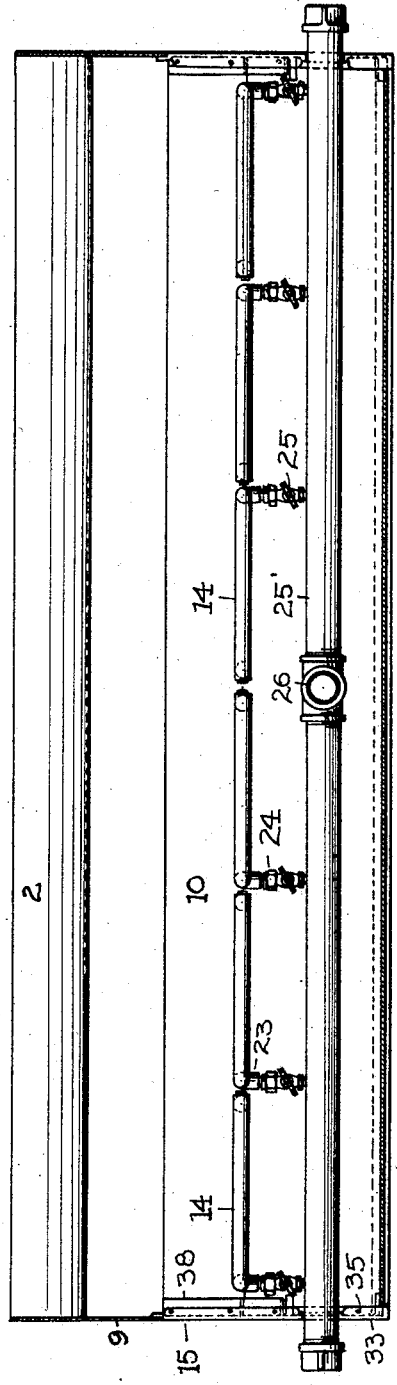

In the drawings accompanying this application, Figure 1 is an end view on a greatly reduced scale of a large baking oven equipped with my improved appliance, and Fig. 2 is a front side elevation thereof. Fig. 3 is an enlarged view, in section, of the central bottom portion of the oven and the heating appliance on the line of the fuel supply pipe. Fig. 4 is a view of the heating appliance on line 4—4, Fig. 5, with its hinged door partly open. Fig. 5 is a front elevation of the central portion of the heating appliance, showing the air damper controlling and operating yoke. Fig. 6 is a horizontal section in plan and on a reduced scale of the heating appliance, on the line 6—6, Fig. 3; and Fig. 7 is a vertical section and side elevation of the same parts on the same scale, on line 7—7, Fig. 3.

The oven shown herein comprises a round cylinder 2 which is closed at its opposite ends and provided with a hinged door 3 at one side. The upper half of the cylinder is a separate hinged section adapted to be raised, and a rotatable shaft 4, driven by suitable power-transmitting means, extends lengthwise through the cylinder and supports a carrier frame 5 having a plural number of long trays 6 pivotally suspended at different radial points thereon so as to travel in an orbit within the cylinder. Legs 7 at opposite ends of the cylinder support it above and apart from the floor, and a longitudinal opening 8 in the bottom of the cylinder is the only point not closed in the cylinder during baking operations. This opening 8, however, is subdivided by spaced walls 9 to provide an elongated combustion space and vertical heat flue 10, together with separate narrower elongated passages 11, which under certain conditions are adapted to serve as outlets or escape openings for the waste heat within the cylinder. Walls 9 are also extended laterally in opposite directions from the center of flue 10 into spaced overlapping relation with the curved insulated walls of the cylinder so as to lengthen the passages 11 and place the entrances 12 thereof within the cylinder at remote points from the discharge end of flue 10.

The trays 6, in their orbital travel, cross in close proximity to flue 10, and the goods to be baked are carried on these trays and therefore directly exposed for short intervals of time to the heat products rising through the flue. All of the heat thus introduced passes upward into the oven and the process of baking proceeds at all the trays in the cylinder providing the degree of temperature at all points is high enough. Uniformity of temperature is maintained and unnecessary loss of heat avoided by compelling the heat to force its way downward and outward through the only outlets in the cylinders, to wit, through passages 11 which are located on opposite sides of heat flue 10. Unless proper relief is afforded the effect of this is to blanket the flame or influence the combustion, and if door 3 is opened, to extinguish the flame by the sudden release of a large quantity of hot gases from within the cylinder and by an induced draft through flue 10.

To overcome these objectionable conditions and results I have extended the passages 11 laterally as shown, and have also placed the walls 9 farther apart from each other at the upper end of the flue 10 than at the lower end, or in other words, have provided a flaring flue. The flue is also made high or deep enough to confine a flame of substantial height, and the heating appliance is further constructed and arranged to prevent the heat which flows downwardly through passages 11 and the heat radiated by the walls 9 from disturbing or influencing perfect combustion within the flue above the fluid burners 14.

That is, I further inclose a row of elongated loop-shaped burners 14 with an elongated sheet-metal inclosing frame or box 15 having a flaring elongated mouth 16 within its upper portion adapted to form the lower end of flue 10. The upper portion of this box at each side of flue 10 is divided into separate air conduits or compartments 17 to protect the base part of the flue from the heat discharged downwardly from the oven outlets 11 and from the radiated heat from the upper part of the flue, and to further promote combustible conditions within the flue the compartments 17 extend the full length of the flue and are open at opposite ends of the box to admit and circulate cold air and thereby keep the base portion of the flue and the air therein at a lower temperature than in the flue and oven above. The double walls 18 and 19 forming the top of box 15 and compartments 17 are preferably inclined downwardly from the flue to where they join with the vertical walls 20 of the box, and the slope or inclination of the upper walls 18 at each side of flue 10 is relatively greater than the lower walls 19. Thus, the heat products passing out of the oven outlets 11 are not obstructed or impeded, and the air within the box is directed upwardly and centrally into the bottom end of flue 10 where the loop burners 14 are located.

Fresh cold air is admitted into box 15 in predetermined amount through slots or openings 21 in one side wall 20 of the box, and hinged damper plates or doors 22 regulate the intake of air or shut it off entirely, and these damper plates extend inwardly to deflect the incoming air downwardly and toward the bottom and center of the box beneath the burners.

Each burner 14 is supported at one end by a nipple 23, a union nut 24, and a valve 25 which is tapped into a distributing header 25' having a single fuel-supply pipe 26. As shown, pipe 26 is connected about midlength of the header and extends through a cast plate 27 fastened to side wall 20 between the adjacent ends of the two slots 21, see Fig. 5. A yoke 28 straddles pipe 26 and the legs of the yoke are pivotally connected with ears on plate 27, and a pair of links 29 pass through small openings in the plate and connect with rigid fingers 30 at the ends of the damper plates 22. A curved spring 31 is also shown as affixed to the plate and adapted to be engaged by yoke 28 to hold the damper plates in open position, but any other suitable means for operating the damper plates may be used. A main valve 32 controls the fuel supply to the header, and the valves 25 regulate the amount of fuel passing to each burner, and these burners are each provided with rows of small orifices drilled oppositely on inclined lines so that separate jets of the combustible fluid will converge and meet and produce a vertical sheet of flame centrally and lengthwise of flue 10. In actual operations the flame is detached and remote from the burner and bottom or intake end of flue 10, and I find that the deflecting walls 18 and the air conduits or compartments 17 play a material part in maintaining perfect combustion in the flue. Recognizing that my present arrangement might be modified and the same results effected I do not limit myself to the construction shown but desire to embrace any equivalent construction capable of giving the same results.

Detailing the construction of box 15 further, it is made sectional to permit it to be separated in the vertical plane of its longitudinal median line. To that end, the skeleton frame of the box comprises separate right and left end sections 33 and 34 whereby the ends of header 25' may be removably supported at the joint line where said sections are united together by overlapping and abutting flanges 35 and screws or bolts 36, and these end sections are covered or closed except at the ends of the triangular compartments 17. These triangular compartments are constructed of flat sheet metal bent to form a conduit of the same length as the side walls of box 15, and one or both may be made separable from the side walls and the end sections, as indicated in Fig. 4, where the triangular top portion at the right side of the box is shown tilted on hinges 37 away from the seating flanges 38 on end section 34, and whereby a doorway and door closure is provided the full length of the box opposite flue 10 and the burners. Consequently, the entire row of burners may be opened to view and reached whenever necessary as in regulating and lighting operations. However, when the flue is closed the burners are incased and protected and disturbing currents of air kept out.

What I claim is:

1. A baking oven having an upwardly flaring combustion flue extending into its bottom, a gaseous-fuel burner within the reduced mouth of said flue, and an inclosed frame for said burner having an air intake.

2. A cylindrical oven having a flaring combustion flue lengthwise of its bottom and laterally-extending escape passages at opposite sides of said flue, a gaseous-fuel burner lengthwise of said flue, and an elongated box for said burner connected with the narrow end of said flue.

3. A baking oven having a walled combustion flue opening into its bottom and provided with an escape passage at the side of said flue for the waste heat products, and an inclined wall beneath each passage adapted to deflect the escaping waste heat from the lower end of the side walls of said flue.

4. A baking oven having a walled combustion space extending upwardly thereinto and a waste heat passage adjacent said space, and the bottom end of said combustion space being flanked by air compartments.

5. A baking oven having a vertical combustion flue and a waste heat outlet at its bottom and an inclined heat deflecting wall and an air space extending lengthwise at each side of the base end of said flue.

6. A baking oven having an opening in its bottom, and a box having a combustion flue extending into said opening and spaced apart from the sides of said opening and provided with an inclined deflecting surface beneath the spaces.

7. A baking oven having waste heat passages and a vertical combustion flue at its bottom and walled triangular air spaces flanking the base of said flue directly beneath said waste heat passages.

8. A baking oven having a separate burner-confining box at its bottom which is provided with a central combustion flue of flaring shape and double walls inclined downwardly and away from the flue at each side thereof.

9. A baking oven having a heating appliance at its bottom consisting of a sectional box having a vertical combustion flue connected with the oven, and a gaseous-fluid burner supported within said box beneath said flue on the meeting lines of the box sections.

10. A heating appliance for a baking oven, comprising an elongated box having a central combustion flue adapted to be openly connected with the bottom of said oven, said box being made in sections and separable in a vertical plane on the longitudinal median line thereof.

11. A baking oven, a box made in separable sections having a flue opening into the bottom of said oven, and a series of gaseous-fuel burners having a distributing header removably secured between and on the meeting line of said sections beneath said flue.

12. A baking oven, an elongated air box having vertical combustion flue extending into the bottom of said oven, a gaseous-fuel supply pipe having a header extending lengthwise through said box beneath the bottom end of said flue, and a series of fluid burners supported upon said header within upper side of said box at the entrance to said flue.

13. A heating appliance for a baking oven, comprising a box having a central vertical combustion flue at its top, a gaseous-fuel pipe extending lengthwise and supported at its opposite ends within said box beneath said flue, and a row of separate gaseous-fuel burners in line with the mouth of said flue having independent regulating valves connected with said pipe and a valve common to all said burners.

14. A heating appliance for a baking oven, comprising an elongated box having a combustion flue at its top and center and air-intake openings extending lengthwise thereof in its side, a series of gaseous-fuel burners arranged within the bottom end of said flue, and regulable damper means at the side of said box adapted to control the flow of air to said burners.

15. A heating appliance for a baking oven, comprising a box having a combustion flue, a header within said box beneath said flue, gaseous-fuel burners within said box connected with and supported by said header, and a single supply pipe connected midlength of said header and extending through one side of said box.

16. A heating appliance for a baking oven, comprising a box having a combustion flue at its top, gaseous-fuel burners within said box having a supply pipe extending through one side of said box, a pair of hinged air-regulating dampers for said box, and a pivoted yoke straddling said pipe and connected with said dampers.

17. A heating appliance for a baking oven, comprising a box having a vertical combustion flue at its center and top and a hinged section extending lengthwise of said flue.

18. A heating appliance for baking ovens, comprising a box having triangular air conduit portions forming the upper side thereof and a combustion flue therebetween, and one of said triangular conduit portions being hinged to the wall of the box.

Signed at Cleveland, in the county of Cuyahoga, and State of Ohio, this 18th day of December, 1919.

HARRY E. KERR.